United States Patent
Boersch

(10) Patent No.: US 10,955,649 B2
(45) Date of Patent: Mar. 23, 2021

(54) METHOD OF STED MICROSCOPY

(71) Applicant: Universitaetsklinikum Jena, Jena (DE)

(72) Inventor: Michael Boersch, Stuttgart (DE)

(73) Assignee: Universitaetsklinikum Jena, Jena (DE)

( * ) Notice: Subject to any disclaimer, the term of this patent is extended or adjusted under 35 U.S.C. 154(b) by 186 days.

(21) Appl. No.: 16/342,183

(22) PCT Filed: Dec. 7, 2017

(86) PCT No.: PCT/EP2017/081887
§ 371 (c)(1),
(2) Date: Apr. 15, 2019

(87) PCT Pub. No.: WO2018/108703
PCT Pub. Date: Jun. 21, 2018

(65) Prior Publication Data
US 2019/0324242 A1   Oct. 24, 2019

(30) Foreign Application Priority Data
Dec. 14, 2016 (EP) .................................... 16204063

(51) Int. Cl.
G02B 21/00 (2006.01)
G02B 5/20 (2006.01)
G02B 27/58 (2006.01)

(52) U.S. Cl.
CPC ......... *G02B 21/0064* (2013.01); *G02B 5/202* (2013.01); *G02B 21/008* (2013.01);
(Continued)

(58) Field of Classification Search
CPC ................ G02B 21/0064; G02B 5/202; G02B 21/0072; G02B 21/0076; G02B 21/008;
(Continued)

(56) References Cited

U.S. PATENT DOCUMENTS 5,731,588 A    3/1998  Hell et al.
9,551,658 B2*  1/2017  Hell .................. G02B 21/16
(Continued)

FOREIGN PATENT DOCUMENTS

DE   10 2012 204 128 A1   9/2013
WO   WO 2015/022635 A1    2/2015

OTHER PUBLICATIONS

Mueller, Veronika, et al., "CW DPSS Lasers Make STED Microscopy More Practical," BioPhotonics (Jun. 30, 2012).
(Continued)

*Primary Examiner* — Arnel C Lavarias
(74) *Attorney, Agent, or Firm* — Christensen, Fonder, Dardi & Herbert PLLC

(57) ABSTRACT

A method for optical microscopy, including using a first laser beam to excite dye particles in a sample region with light having a first wavelength. A second laser beam with a second wavelength based on the emission spectrum of the excited particles is used to de-excite the excited particles. The first and second beams have first and second respective intensity distributions which are spatially different when co-aligned; the second profile has a minimum where the first has a maximum. The region is once concurrently illuminated with the first and second beams, and an emission signal is detected. For each scanning point, the region is illuminated also with a pulse of the second laser beam or continuously prior to or after illuminating the region of the sample concurrently with both lasers. The illumination with only the second laser beam defines a background signal that is subtracted from the emission signal.

14 Claims, 3 Drawing Sheets a)

b)

(52) U.S. Cl.
CPC ..... *G02B 21/0072* (2013.01); *G02B 21/0076* (2013.01); *G02B 27/58* (2013.01)

(58) Field of Classification Search
CPC ........ G02B 27/58; G02B 5/26; G02B 21/002; G02B 21/0024; G02B 21/0004; G02B 21/361; G02B 21/367
USPC ....... 359/368, 362, 363, 369, 385, 387, 388, 359/389, 390; 356/51, 402, 416, 417, 356/419, 420
See application file for complete search history.

(56) References Cited

U.S. PATENT DOCUMENTS

| | | |
|---|---|---|
| 9,575,302 B2* | 2/2017 | Booth .................. G01N 21/636 |
| 9,632,296 B2 | 4/2017 | Wolleschensky et al. |
| 9,721,326 B2* | 8/2017 | Piche .................. G02B 21/367 |
| 9,772,285 B2* | 9/2017 | Vicidomini ........ G01N 21/6428 |
| 2013/0256564 A1 | 10/2013 | Hell et al. |
| 2015/0008309 A1 | 1/2015 | Wolleschensky et al. |

OTHER PUBLICATIONS

Vicidomini, Giuseppe, et al., "STED with wavelengths closer to the emission maximum," Optics Express, vol. 20, No. 5, pp. 5225-5236. (Feb. 27, 2012).

* cited by examiner

METHOD OF STED MICROSCOPY

PRIORITY CLAIM

The present application is a National Phase entry of PCT Application No. PCT/EP2017/081887, filed Dec. 7, 2017, which claims priority from European Patent Application 16204063.8, filed Dec. 14, 2016, the disclosures of which are hereby incorporated by reference herein in their entirety.

FIELD OF THE INVENTION

The invention relates to a method for optical microscopy by scanning a sample. The method is related to so-called optical super-resolution microscopy based on stimulated emission depletion (STED).

BACKGROUND OF THE INVENTION

STED microscopy is one of the methods which can resolve spatially details of a microscopic sample below the fundamental Abbe diffraction limit which corresponds to about half of the wavelength of the light to be detected. For example, a single molecule having a length of about 1 nm and emitting fluorescent light at a wavelength of 600 nm will show in an image taken with a common microscope as a round spot with a diameter of about 300 nm. Two or more molecules spaced apart less than 300 nm therefore cannot be separated spatially when imaged with a common confocal microscope.

To investigate samples by confocal scanning microscopy, certain regions of it usually are marked with luminescent molecules, which in the following are denoted as dye particles. The region of the sample might be either a two-dimensional area or a three-dimensional volume. The term luminescence is meant to cover both fluorescence and phosphorescence, although for the microscopic analysis of samples mostly fluorescent dye particles are used.

Using STED microscopy it is possible to overcome the diffraction limit and a resolution down to distances of about 10 nm becomes possible. Its basic concept is for example described in U.S. Pat. No. 5,731,588. In STED microscopy, two laser light beams are used to control the photo physics of the dye particles contained in a region of the sample. A first laser beam emitted by a first laser with light having a first wavelength is used to excite dye particles contained in the region of the sample. The wavelength of the first laser beam is chosen depending on the absorption spectrum of the dye particles used for marking a specific sample. The size of the region depends on the settings used. In a confocal scanning environment, a region typically corresponds to the area or volume which can be illuminated with the first laser beam in the focal spot without moving it spatially. By scanning the sample region by region and detecting the intensity caused by luminescence—the term luminescence comprising fluorescence as well as phosphorescence—in each region, a two- or three-dimensional image consisting of pixels or voxels can be generated; a three-dimensional image can also be generated by combining a stack of two-dimensional images which have been taken at different positions of the focal spot along the optical axis.

In STED microscopy, the region of the sample is also illuminated by a second laser beam with light having a second wavelength. This second laser sometimes is also denoted as STED laser. It is used for de-exciting a part of the excited dye particles contained in the region of the sample illuminated by the first laser beam.

For de-exciting, in state-of-the-art approaches the second wavelength is larger than the first wavelength which also means that in principle the region of the sample which is illuminated by the second laser beam is somewhat larger than the region illuminated by the first laser beam, due to the diffraction limit. Both laser beams are co-aligned, i.e. sharing the same optical axis when illuminating the sample.

The first laser beam has a first intensity distribution and the second laser beam has a second intensity distribution, and enhancing the spatial resolution can be achieved by forming the intensity distributions in the following way: Both intensity distributions are spatially different when co-aligned along a common optical axis, and the second intensity distribution has a minimum where the first intensity distribution has a maximum which further is located in the center of the—preferably rotationally symmetric—first intensity distribution.

The first intensity distribution can for example be shaped in Gaussian form, with or without showing side lobes, however, those side lobes do not count as maxima when regarding the condition of distinctiveness of the two intensity distributions, meaning that the second intensity distribution is not required to have minima where the side lobes of the first intensity distribution are located. The region of the sample in which dye particles are excited then corresponds to the focal spot of the first laser beam, since due to the first intensity distribution the probability to excite dye particles with the first wavelength is highest in the center of the focal spot. Emission of luminescent, in particular fluorescent light—usually due to a Stokes shift at a different wavelength—then occurs consequently also mainly around the center of the first intensity distribution, the intensity of the emission signal decreasing with increasing distance from the center, depending on the width of the first intensity distribution.

To enhance spatial resolution most effectively, the intensity distribution of the second laser beam has minimum intensity in its center, but its maximum intensity is essentially annular-shaped around the center. Having a Gaussian-shaped or similar profile around the maximum, the annular shape of the intensity distribution of the second laser beam sometimes also is denoted as "doughnut". Moreover, the term "essentially annular-shaped" includes also intensity distributions that are formed for example by diffractive optical elements (DOE) and do not have ideal $C_\infty$ symmetry, but less, e.g. $C_4$ symmetry, although basically still reminding annular shape.

While dye particles are excited with the first laser beam in the focal spot and in particular in its center, light of the second laser beam causes de-excitation of the dye particles in the ring surrounding the center by stimulated emission at the same time. Since both beams are used for illuminating the region of the sample at the same time, the depletion of excited molecules occurs in those parts of the focal spot where the intensity of the second laser beam is not zero. Therefore, only excited dye particles in the center of both co-aligned focal spots can emit luminescence. By using intensity distributions which are distinct in this way it becomes possible to enhance spatial resolution, since the second intensity distribution effectively narrows the broad intensity distribution around the maximum of the first intensity profile. Moving the co-aligned focal spots of the two laser beams across the sample covering a variety of regions consequently generates a super-resolved image of the sample beyond the diffraction limit.

By varying the intensity of the second laser beam the spectral probability to de-excite the dye molecules is varied and therefore the magnitude of reducing the spatial size of luminescence in the focal spot by the STED process is also varied: As the intensity of the second laser beam is increased, the probability of simulated emission increases as well, and the remaining region for luminescence in the focal spot decreases.

Since the overall spatial size of the part of the focal spot where luminescence takes place is reduced by the second laser beam, also the number of photons available for detection is decreased. This loss or reduction of signal in the state of the art is compensated for by shifting the second wavelength towards the long-wavelength end of the luminescence emission spectrum of the dye particles. By adjusting the difference between the first and the second wavelength, the spectral range of detectable photons can be optimized to protect the photon detectors by completely rejecting any backscattered laser light for both the first and the second wavelength. This is achieved by using high-performance optical filters with optical densities OD>6 which at the respective wavelengths have spectral widths between 10 nm for smaller wavelengths and 40 nm for larger wavelengths.

Given a typical luminescence spectrum of suitable dye particles, a spectral range up to 120 nm is remaining, meaning that about 80-90% of the maximum number of photons emitted from the dye particles can be detected.

However, the aforementioned STED method as performed in the state of the art has some disadvantages. For a given second wavelength, the optical resolution scales quadratically with the used laser power for the second laser beam. Choosing the second wavelength at the long-wavelength end of the emission spectrum results in a small cross section for stimulated emission. Therefore, to increase the probability of de-exciting an excited dye particle high laser power for the second laser beam should be used to stimulate emission depletion. Such high laser power may cause in particular in biological samples of living cells massive photophysical and photochemical damage that might deteriorate the biological implications of the super-resolved imaging. In addition, scanning several times over the same region of the sample is not possible due to photobleaching of the dye particles. To reduce the laser power, i.e. the intensity necessary for the second laser beam used for STED, one could increase the cross section for stimulated emission, since then the probability of de-exciting dye particles also would increase. To increase the cross section, the second wavelength could basically be shifted from the long-wavelength end of the emission spectrum towards slightly shorter wavelengths. Such an approach is described for example in WO 2015/022635 and in an article by D. Vicidomini et al., "STED with wavelengths closer to the emission maximum", published in Optics Express 20 (5), p. 5225 ff. (2012). When shifting the second wavelength for STED towards shorter wavelengths, also the probability of exciting further dye particles that have remained in the ground state directly with the second laser beam increases, resulting in undesirable background luminescence.

Increased background luminescence and diminished power for the second laser beam negatively influence the image contrast. However, since the spatial frequency content of the image is not distorted by this approach, the image taken when the region of the sample is concurrently illuminated with the first and the second laser beam is a superposition of a super-resolved standard image generated by the excitation beam and a background image generated by the second laser beam. Consequently, a combined emission and background signal is detected. On the other hand, a background signal can be defined when the region of the sample is illuminated only with the second laser beam, since then only the background signal will be detected. The emission signal then can be separated by standard algorithms from the background signal, e.g. by subtraction which can be done region-wise, i.e. for each single measurement. Afterwards, further deconvolution methods can be applied if appropriate.

This procedure results in a super-resolved image for only the emission signals. In the aforementioned state of the art, the background signal is recorded using the second laser beam only, either with pulsed STED excitation or with continuous excitation with the second laser beam. The background signal can be detected prior to illuminating the sample with the combined beams, or afterwards. The duration of recording both the background-only image and the superimposed image when the sample is illuminated concurrently with both laser beams is chosen to be much larger than the average lifetime of the excitation state of the dye particles, also to make sure that the background is recorded in a time window when no excitation with the first laser beam occurs. The image is taken pixel by pixel with a fibre acting as a pinhole corresponding to a diameter of one Airy unit, and subtraction is also done pixel by pixel or line by line.

However, even with this approach the power for the second laser beam, the STED beam, is still too high for some sensitive biological samples and still either damages the sample or triggers photobleaching which means that the sample cannot be imaged repeatedly.

SUMMARY OF THE INVENTION

An object of the invention therefore is to modify a method for optical microscopy based on STED to allow an even wider range of biological samples to be analysed. Another aim of the invention is to increase resolution even further.

For a method of the kind described above, these aims are achieved by applying several measures. At first, the second wavelength, i.e. the wavelength of the STED laser beam, is chosen within the wavelength range defined by the full width at half maximum (FWHM) of the emission spectrum of the excited dye particles. In this range of the spectrum—which depends on the dye particles used—and by choosing the second wavelength for stimulated emission depletion in this range it is ensured that the cross section for this kind of emission is large enough to allow a noticeable reduction of the exposure of the sample to light of the second laser. Compared to standard STED techniques, the necessary power for the second laser beam can be reduced by more than 40%.

However, using the wavelength in the range of the FWHM alone is not enough: As the second wavelength is within the emission spectrum of the respective dye particles, it must be taken care that the signal is not distorted by backscattered STED laser light of the second wavelength. Using regular high-performance optical filters like notch filters will not help, since those still have a spectral width of at least 10 nm to 40 nm, depending on the second wavelength. Using such filters to block the STED laser light at the second wavelength will result in a significant loss of the luminescence signal by at least 30%. For that reason, as a second measure the backscattered STED light has to be blocked before it is detected by a detector for image recording.

In a first alternative, backscattered light with the second wavelength, i.e. the STED laser light is blocked by arranging an ultra-narrow line transmission filter or preferably a cascade of at least two ultra-narrow line transmission filters in the beam path between the sample and the detector.

The ultra-narrow line transmission filter is adapted to the second wavelength and transmits only this wavelength in an ultra-narrow band with the second wavelength in the center of the band. Apart from this small range, light with different wavelengths—including the luminescence signals emitted by the dye particles in the sample outside of the small range—is reflected, and only the reflected part of the light is detected.

Basically, it is enough to use only one ultra-narrow line transmission filter, but it is of advantage if several of these ultra-narrow line transmission filters are arranged in a cascade, since blocking becomes more efficient and optical losses for the second wavelength in the range of corresponding optical densities OD with values between 6 and 10 can be achieved. On the other hand, almost all the emission signal—about 95%—can be maintained and detected. This approach which filters transmission is therefore applicable to almost all types of lasers used for generating a STED laser beam. Furthermore, ultra-narrow bandpass filters are commercially available. In an advantageous embodiment, it is possible to adapt the transmission wavelength by swiveling the filter around an axis perpendicular to the optical axis. This makes it possible to use these filters together with tuneable pulsed or continuous-wave STED lasers, in particular with lasers emitting light with a narrow line width of less than 1 nm, preferably less than 0.1 nm.

In the second alternative, blocking is achieved by using a narrow-band laser, preferably a single-frequency laser for generation of the second laser beam in combination with an ultra-narrow line absorption filter in the detection beam path, adapted to the second wavelength. The use of narrow-band lasers for generating the second laser beam, preferable single frequency lasers—like dye lasers, solid state lasers or gas lasers—is preferred since these laser systems operate at exactly one wavelength with high power and highest spatial and temporal stability. Of course, also other lasers emitting light in a wider band or at several wavelengths at the same time can be used, however, the intensity then is reduced since it has to be divided among all wavelengths. Furthermore, light having not the second wavelength has to be filtered out as well, preferably already in the illumination beam path for which also an ultra—narrow line transmission as described before can be used, or at the laser source itself. Further, it is possible to use the single-frequency lasers also together with the ultra-narrow transmission filters used in the first alternative.

As ultra-narrow line absorption filter preferably an atom vapor filter is used, preferred with an optical density OD of more than 10. Atom vapors show very narrow absorption lines with a spectral width down to less than $10^{-3}$ nm. The line width of a given atom vapor can be fine-tuned because it depends on the temperature due to Doppler broadening, preferably the spectral width should be less than 1 nm, more preferably less than 0.01 nm. Preferably atom vapor filters based on heated alkali metals in vacuum cuvettes are used. For example sodium atom vapor shows two absorption lines at 598 nm, lithium vapor two lines at 671 nm, and potassium vapor at 766 nm and 770 nm. The exact absorption line can be adapted by temperature and all alkali atom vapor absorption lines are spectrally very similar to the commercially used pulsed or continuous-wave STED lasers for generating the second laser beam with a wavelength of about 590 nm, 660 nm or 766 nm, depending on the dye particles used. The optical density can be adapted by changing the length of the gas volume which the light has to pass. Light of the second wavelength backscattered from the sample can be absorbed very efficiently by those filters which on the other hand also protect the sensitive detectors.

The method works in particular efficient if the second wavelength is chosen such as to result in maximum depletion of the excited dye particles, preferably to coincide with the maximum emission wavelength in the emission spectrum of the dye particles excited by the first laser beam. In this way it can be made sure that most of the luminescence is detected.

With the aforementioned described measures it is possible to keep the super-resolution as in standard STED approaches with the advantage of using much less power for the second wavelength.

The region illuminated is defined by the focal spot of the first laser beam. The first laser beam excites dye particles either in single-photon or in multi-photon mode, the latter mode allowing to focus on a small region along the optical axis of the laser beam, i.e. to reduce it merely to a plane.

In a particularly preferred embodiment the emission signal and the background signal each are detected spatially resolved—yet confocally—using a multi-point detector with an adjustable overall detection area covering at least the Airy disk area of the emission signal, the detection area consisting of an array of sub-areas, wherein each sub-area is assigned biuniquely to a point detector of the multi-point detector.

The multi-point detector replaces the confocal pinhole usually used in the state of the art, the pinhole for example being realized as entrance surface of a fibre. The overall area for detection covers at least the Airy disk area of the emission signal, i.e. of the luminescence emission signal of the dye particles excited by the first laser beam with the first wavelength in the focal spot of the first laser beam. However, while in the state of the art a single detector is used, the multi-point detector consists of an array of point detectors with sizes significantly smaller than the Airy disk. For example, each point detector in the array could have a diameter of about 20% of an Airy disk. The point detectors are shaped as to cover the whole area of the Airy disk, preferably the point detectors are arranged in a way that there remain no blind spots—areas where no detection occurs—, apart from small areas where the edges of the point detectors are contacting each other. The term "array" includes not only rectangular grids, but also affine grids, for example when the point detectors used for making up the array have surfaces of hexagonal symmetry. The signal with highest intensity is then recorded in the central point detector of the array which is adjusted to lie on the optical axis. Also the lowest background is measured there if the sample is illuminated only with the second laser beam. The point detectors spatially surrounding the central point detector will detect also both signals, i.e. the one with concurrent illumination by the two laser beams and the one generated with only the second laser beam to get the background signal. Ideally, the point detectors are individually controllable as to vary the weighted contribution of each of the single point detectors. In this way, the effective size of the confocal pinhole can be optimized even after image recording, and also the confocal resolution can be enhanced and optimized by using signals only from the inner detectors that map only a small part of the Airy disk. Optional subsequent deconvolution of the image with state-of-the-art algorithms can improve resolution further by up to a factor of 1.7 in all three dimensions. A time-gated determination of the background signal in combination with the spatially resolved background measurement by a multi-point detector, optionally together with post-data acquisition deconvolution, enables precise not only background correction in the super-resolved STED image, but also a further increase in resolution by post-data acquisition deconvolution.

It is understood that the features mentioned before and in particular in the claims, and the features to be explained below are applicable not only in the combination stated but also in other combinations or as standalone features without leaving the scope of the present invention.

BRIEF DESCRIPTION OF THE DRAWINGS

Below, the invention will be explained in more detail with reference to the accompanying drawings, which also show features essential to the invention, among others, and in which FIG. 1a), b) show typical setups for STED microscopy.

DETAILED DESCRIPTION

Figure 1:
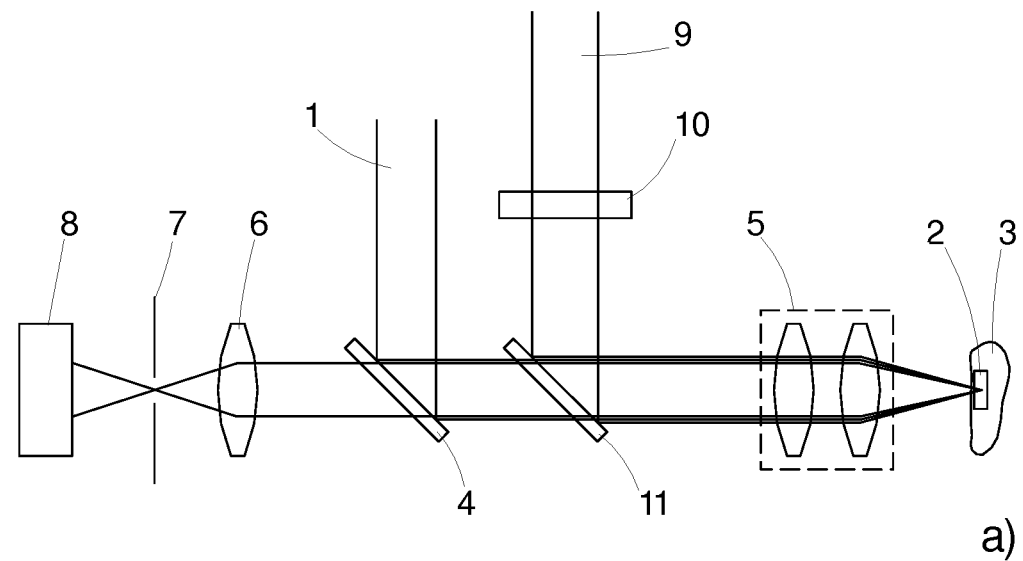
Figure 1:
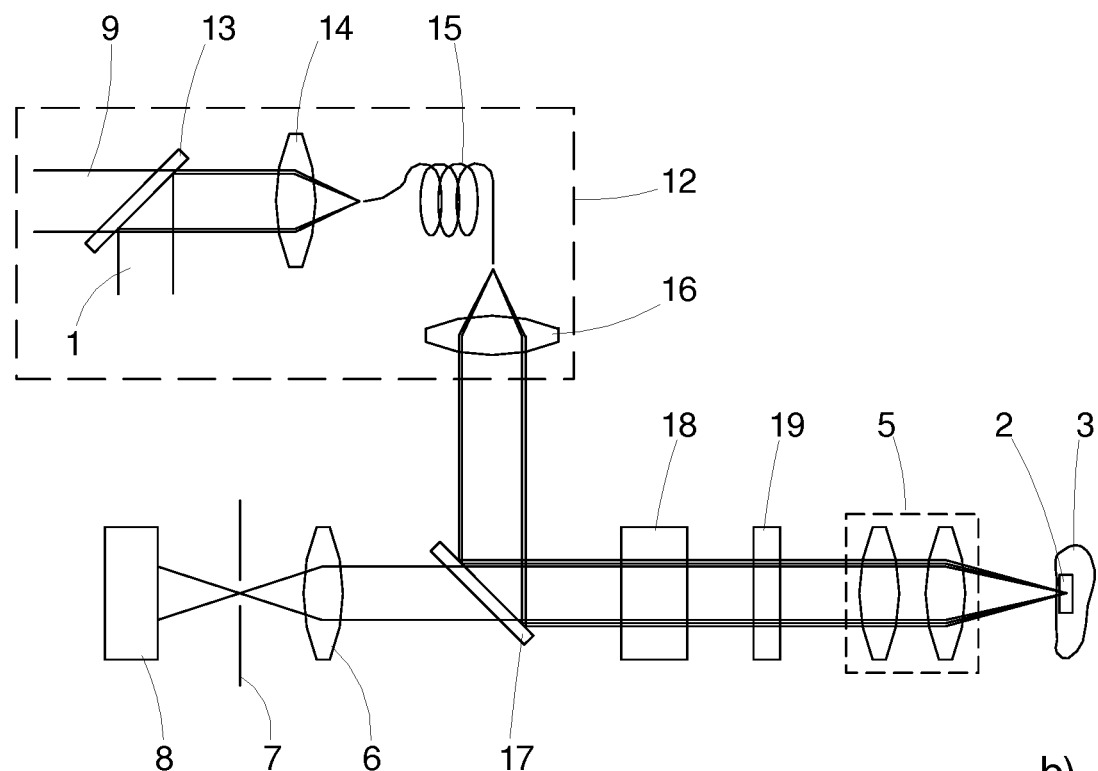

FIG. 1a) shows a typical setup for STED microscopy which is very similar to that of a confocal scanning microscope. In STED microscopy a first laser beam 1 with light having a first wavelength is used to excite dye particles contained in a region 2 of a sample 3. The region can be either two- or three-dimensional, depending on the type of scanning. The sample 3 or at least the region 2 of the sample 3 is marked with the dye particles which emit luminescence, in particular fluorescence when excited. The first wavelength usually corresponds to the absorption wavelength of the dye particles used. The first laser beam 1 is coupled into the beam path by a dichroic mirror 4. Through an objective lens 5 it is directed onto the sample. Prior to entering the objective lens 5, the beam passes a scan unit which is not shown here. The scan unit has the purpose of moving the focal spot which the first laser beam 1 forms in the region 2 of the sample 3 in lateral directions and/or in axial direction, i.e. to scan a selected part of the sample by moving the region 2 around. Such scan units are well known in the state of the art and usually comprise one or more scanning mirrors for lateral scanning and means for shifting the focus in axial direction. Dye particles usually show a Stokes-shift between the wavelengths for absorption maximum and emission maximum, i.e. the absorption wavelength is not the same as the emission wavelength at their respective maxima.

Light emitted from the sample 3 is collected by the objective lens 5, de-scanned if necessary and fed by a lens 6 through a pinhole 7 to a detector 8. In front of the detector 8—not shown—is arranged an emission filter which removes any residual excitation light.

Further, a second laser beam 9 with light having a second wavelength is used to de-excite a part of the excited dye particles contained in the region 2. The first laser beam 1 has a first intensity distribution which usually is rotational symmetric with respect to the optical axis of illumination and which has a Gaussian-shaped profile. Therefore, the first laser beam has its maximum intensity in its center. Intensity is chosen in a way that the first laser beam 1 excites dye particles either in single or in multi-photon mode.

The second laser beam 9 has a second intensity distribution. It is coupled into the beam path for illumination with a dichroic mirror 11 or a mirror like a glass-plate, reflecting light basically independent from the wavelength, but with higher transmission. The first and the second intensity distribution are spatially different when co-aligned which is the case here. In particular has the second intensity distribution a minimum where the first intensity profile has a maximum. More specifically, the second intensity distribution is essentially of annular or toroidal shape with minimum intensity in its center and maximum intensity in a ring around the minimum. To create this second intensity profile, the second laser beam 9 is directed to a beam shaping device 10 which is located in or close to a conjugated back focal plane.

When the region 2 of the sample 3 is illuminated concurrently with the first laser beam 1 and the second laser beam 9, stimulated emission occurs in the annular region around the center of the first intensity distribution, thereby reducing the number of excited particles around the center of the first focal spot, effectively sharpening the first intensity distribution, respectively increasing its localization.

A slightly different setup for STED microscopy is shown in FIG. 1b). Here, a joint beam device 12 is used in which the first laser beam 1 and the second laser beam 2 are generated, coupled by a dichroic mirror 13 into a joint beam path and further coupled by a coupling lens 14 into an optical fibre 15. By a collimating lens 16 and a dichroic mirror 17 the beams are directed towards the objective lens 5 and onto the sample 3. A scan unit 18 is used for scanning the focal spot of the beam, i.e. shifting the region 2 in the sample 3 laterally and/or vertically. First laser beam 1 and second laser beam 9 share a common, chromatic beam shaping device 19 that treats the first wavelength, the second wavelength and the emission wavelengths appropriately. As a chromatic beam shaping device 19 for example a segmented wave plate (SWP) can be used which is arranged in a pupil plane. The fibre 15 for both laser beams 1, 9 can be designed to transmit only the central mode $TEM_{00}$ and both beams exit from the fibre 15 co-aligned and with a Gaussian-shaped intensity distribution. The chromatic beam shaping device 19 manipulates the light depending on its wavelength in a way that the first intensity distribution is essentially not modified, while the second intensity distribution of the second laser beam gets its essentially toroidal form.

Figure 2:
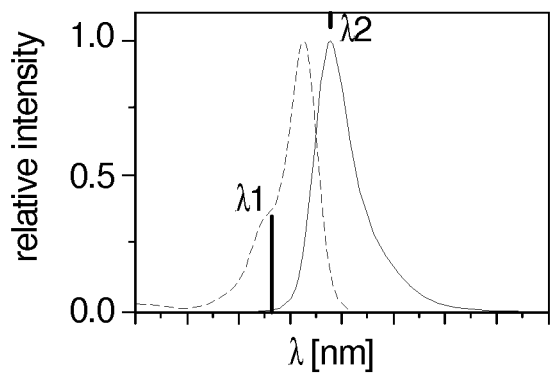
FIG. 2 shows a typical absorption and emission spectrum for a dye particle.

FIG. 2 shows the absorption spectrum (dashed lines) and the emission spectrum for fluorescence (full lines) of a typical dye particle. Relative intensity is shown dependent on the wavelengths. The first wavelength is denoted by $\lambda_1$, it is used to excite the dye particles. The second wavelength is chosen within the wavelength range defined by the full width at half maximum (FWHM) of the emission spectrum of the excited dye particles. Here, the second wavelength—denoted by $\lambda_2$—is chosen such as to result in maximum depletion of the excited dye particles, that is it coincides with the maximum emission wavelength of the dye particles excited by the first laser beam.

In this way, the cross section for stimulated emission is at its maximum and de-excitation can be performed with minimum intensity. Nevertheless, a clean emission signal should be imaged and backscattered light of the second wavelength as well as the signal resulting only from stimulated emission should not be contained in the image.

Backscattered light of the second wavelength originating from the second laser beam 9 can be blocked by two alternative approaches.

Figure 3:
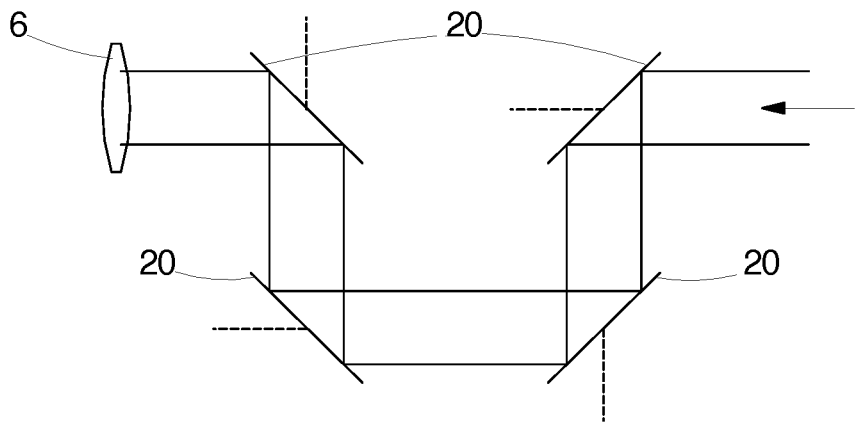
FIG. 3 shows a cascade of ultra-narrow line transmission filters.

In the first alternative at least one ultra-narrow line transmission filter adapted to transmit only light of the second wavelength in an ultra-narrow band of the less than 2 nm, preferably less than 1 nm is used in the beam path. Apart from the second wavelength, light of all other wavelengths is reflected, meaning that 95% of the emitted light can be directed towards the detector 8. It is in particular advantageous, to arrange such ultra-narrow line transmission filters in a cascade to increase the optical density. Such a cascade is for example shown in FIG. 3, it could for example be arranged in the detection beam path between dichroic mirror 4 and lens 6. FIG. 3 shows a cascade of four ultra-narrow transmission filters 20, redirecting the light four times and each time coupling out light of the second wavelength, denoted by the dotted lines.

Another possibility is to use a narrow-band laser, in particular a single-frequency laser, for generating the second laser beam in combination with an ultra-narrow line absorption filter adapted to the second wavelength. The ultra-narrow line absorption filter can for example be realized as atom vapor filter having a spectral width of less than 1 nm, preferably less than 0.01 nm. The spectral width can be tuned by temperature control, e.g. the filter can be arranged at the same position as the cascade of filters 20 described in relation to FIG. 3 in the detection beam path.

Figure 4:
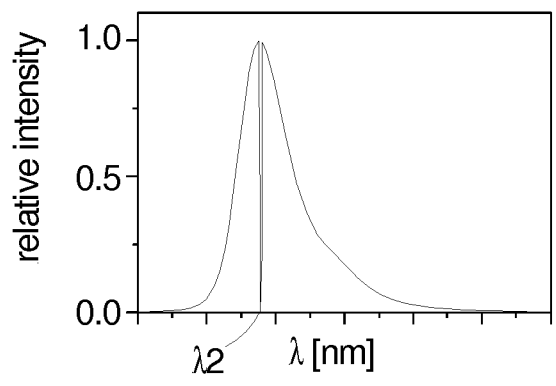
FIG. 4 shows the detectable fluorescence spectrum according to one embodiment.

The detectable emission spectrum by using this approach for blocking is shown in FIG. 4. Only a very narrow band—depending on the spectral range of the filter—is blocked and most of the emitted intensity can be detected, while for optical microscopes of this type in the state of the art a much larger spectral range would be blocked.

To get an image of the undistorted intensity distribution of only the emission signal for the first wavelength with enhanced resolution, the background signal has to be separated from the detected image. For that purpose, each region 2 of the sample 3 is illuminated twice, once with only the second laser beam, defining a background signal, and once with concurrent illumination by the first and the second laser beam, defining the emission signal. Then, the emission signal can be separated from the background signal, for example simply by region-wise subtraction of the background signal, but also or additionally by deconvolution methods taking into account neighboured regions as well.

Figure 5:
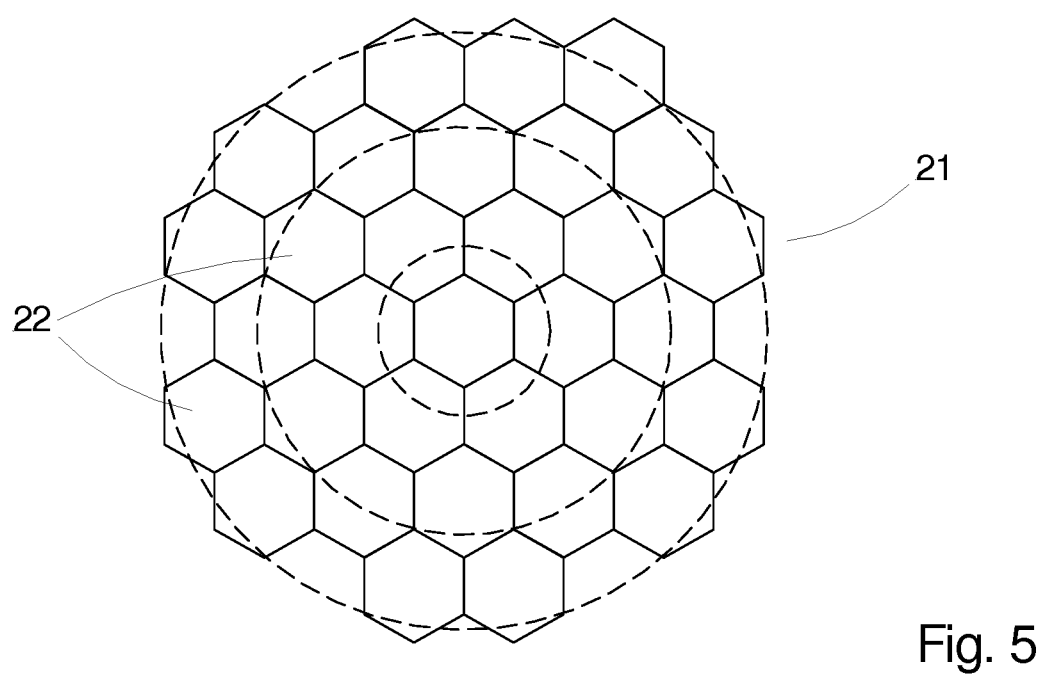
FIG. 5 shows the surface of a multi-point detector.
Figure 6:
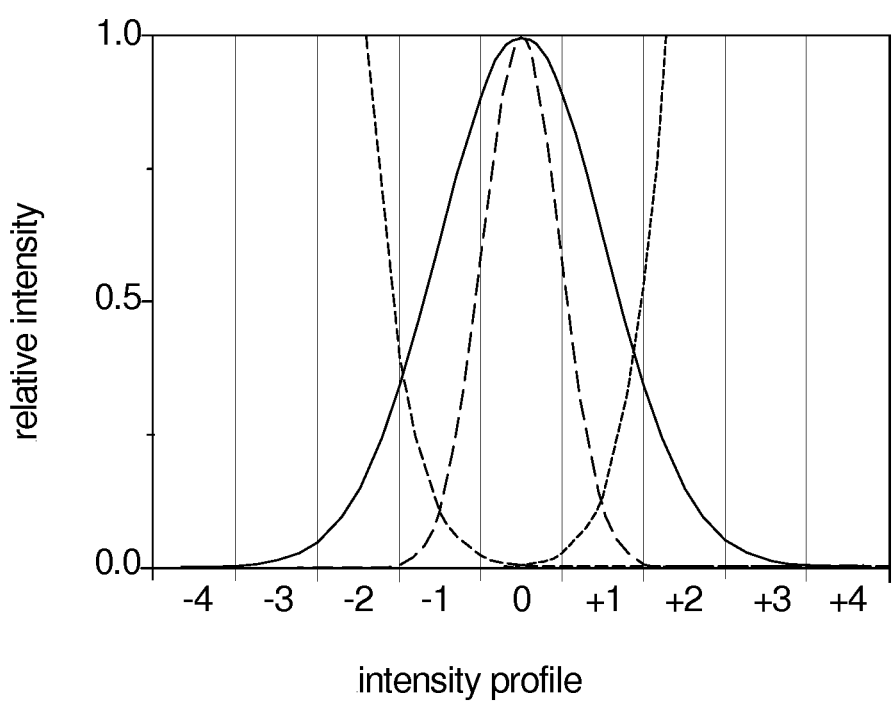
FIG. 6 shows the intensity distributions on the multi-point detector.

To enhance the spatial resolution further it is of particular advantage to detect the emission signal and the background signal for each region spatially resolved by using a multi-point detector with an adjustable overall detection area covering more than the Airy disk area of the emission signal. Such a multi-point detector 21 which can replace the common point detector 8 is shown in FIG. 5. The detection area consists of an array of sub-areas and each sub-area is assigned biuniquely to a point detector 22 of the multi-point detector 21, that is each sub-area corresponds to only one point detector. The dashed circles correspond to the diffraction rings in the Airy disk. The spatially resolved detection is shown in FIG. 6 along a line having a central point detector denoted with 0 and to each side for further point detectors. The full line denotes the emission signal detected for the first wavelength with the first laser beam 1, but without the second laser beam. The intensity profile or intensity distribution of the second laser beam 9 is shown with short-dashed lines. In the center there is no intensity, but in the outer parts intensity is at its maximum. In these areas, stimulated emission takes place. The resulting emission signal detectable for the first wavelength is shown as the curve with long-dashed lines, the profile having a smaller FWHM than the original one after the emission signal has been separated from the background signal. Since the point detectors 22 of the multi-point detector 21 can be controlled individually and their contribution can be weighted individually, it is possible to enhance the spatial resolution further compared to common STED microscopy.

LIST OF REFERENCE NUMERALS 1 first laser beam
2 region
3 sample
4 dichroic mirror
5 objective lens
6 lens
7 pinhole
8 detector
9 second laser beam
10 beam shaping device
11 dichroic mirror
12 beam device
13 dichroic mirror
14 coupling lens
15 optical fibre
16 collimating lens
17 dichroic mirror
18 scan unit
19 chromatic beam shaping device
20 ultra-narrow transmission filter
21 multi-point detector
22 point detector

The invention claimed is:

1. A method for optical microscopy by scanning a sample, comprising the steps of:
   using a first laser beam with light having a first wavelength to excite dye particles contained in a region of the sample, the first laser beam having a first intensity distribution,
   using a second laser beam with light having a second wavelength to de-excite a part of the excited dye particles contained in the region, the second laser beam having a second intensity distribution, the first intensity distribution and the second intensity distribution being spatially different when co-aligned, with the first intensity distribution having a maximum in its center and the second intensity distribution having a minimum where the first intensity distribution has a maximum,
   illuminating the region of the sample with only the second laser beam, defining a background signal,
   illuminating the region of the sample concurrently with the first laser beam and the second laser beam and detecting a combined emission and background signal,
   separating the emission signal from the background signal,
   wherein the second wavelength is chosen within a wavelength range defined by a full width at half maximum (FWHM) of an emission spectrum of the excited dye particles, and
   backscattered laser light of the second wavelength is blocked with at least one ultra-narrow line transmission filter which reflects light not being transmitted, and
   wherein the filter is adapted to the second wavelength and arranged in a beam path between the sample and a detector.

2. The method according to claim 1, wherein for generating the second laser beam a single-frequency laser is used.

3. The method according to claim 1, wherein a plurality of ultra-narrow line transmission filters arranged in a cascade is used to enhance an overall optical density OD.

4. The method according to claim 1, wherein the second wavelength is chosen such as to result in maximum depletion of the excited dye particles to coincide with a maximum emission wavelength of the dye particles excited by the first laser beam.

5. The method according to claim 1, wherein the emission signal and the background signal each are detected spatially resolved using a multi-point detector with an adjustable overall detection area covering at least an Airy disk area of the emission signal, the detection area consisting of an array of sub-areas, wherein each sub-area is assigned biuniquely to a point detector of the multi-point detector.

6. The method according to claim 1, wherein the at least one ultra-narrow line transmission filter has a spectral width of less than 2 nm.

7. The method according to claim 3, wherein the at least one ultra-narrow line transmission filter has a spectral width of less than 2 nm.

8. A method for optical microscopy by scanning a sample, comprising the steps of:
using a first laser beam with light having a first wavelength to excite dye particles contained in a region of the sample, the first laser beam having a first intensity distribution,
using a second laser beam with light having a second wavelength to de-excite a part of the excited dye particles contained in the region, the second laser beam having a second intensity distribution, the first intensity distribution and the second intensity distribution being spatially different when co-aligned, with the first intensity distribution having a maximum in its center and the second intensity distribution having a minimum where the first intensity distribution has a maximum,
illuminating the region of the sample with only the second laser beam, defining a background signal,
illuminating the region of the sample concurrently with the first laser beam and the second laser beam and detecting a combined emission and background signal,
separating the emission signal from the background signal,
wherein the second wavelength is chosen within a wavelength range defined by a full width at half maximum (FWHM) of an emission spectrum of the excited dye particles, and backscattered laser light of the second wavelength is blocked with an ultra-narrow line absorption filter in combination with a narrowband laser to generate the second laser beam, and
wherein the filter is adapted to the second wavelength and arranged in a beam path between the sample and a detector.

9. The method according to claim 8, wherein for generating the second laser beam a single-frequency laser is used.

10. The method according to claim 8, wherein the ultra-narrow line absorption filter has a spectral width of less than 1 nm and an optical density OD of more than 10.

11. The method according to claim 10, wherein the ultra-narrow line absorption filter has a spectral width of less than 0.01 nm.

12. The method of claim 10, wherein the ultra-narrow line absorption filter comprises an atom vapor filter.

13. The method according to claim 8, wherein the second wavelength is chosen such as to result in maximum depletion of the excited dye particles to coincide with a maximum emission wavelength of the dye particles excited by the first laser beam.

14. The method according to claim 8, wherein the emission signal and the background signal each are detected spatially resolved using a multi-point detector with an adjustable overall detection area covering at least an Airy disk area of the emission signal, the detection area consisting of an array of sub-areas, wherein each sub-area is assigned biuniquely to a point detector of the multi-point detector.

* * * * *

UNITED STATES PATENT AND TRADEMARK OFFICE
CERTIFICATE OF CORRECTION

PATENT NO. : 10,955,649 B2
APPLICATION NO. : 16/342183
DATED : March 23, 2021
INVENTOR(S) : Michael Boersch It is certified that error appears in the above-identified patent and that said Letters Patent is hereby corrected as shown below:

In the Specification

Column 1, Line 41, delete "for example" and insert -- for example, -- at each occurrence throughout the Patent.

Column 2, Line 45, delete "(DOE)" and insert -- (DOEs) --, therefor.

Column 5, Line 23, delete "swiveling" and insert -- swivelling --, therefor.

Column 5, Line 58, delete "For example" and insert -- For example, --, therefor.

Column 7, Line 15, delete "which" and insert -- which: --, therefor.

Column 7, Line 16, delete "FIG. 1a), b)" and insert -- FIGS. 1a), 1b) --, therefor.

Signed and Sealed this
Twelfth Day of July, 2022

Katherine Kelly Vidal
*Director of the United States Patent and Trademark Office*